A. E. THORN.
Churn.
No. 63,580.
Patented April 2, 1867.
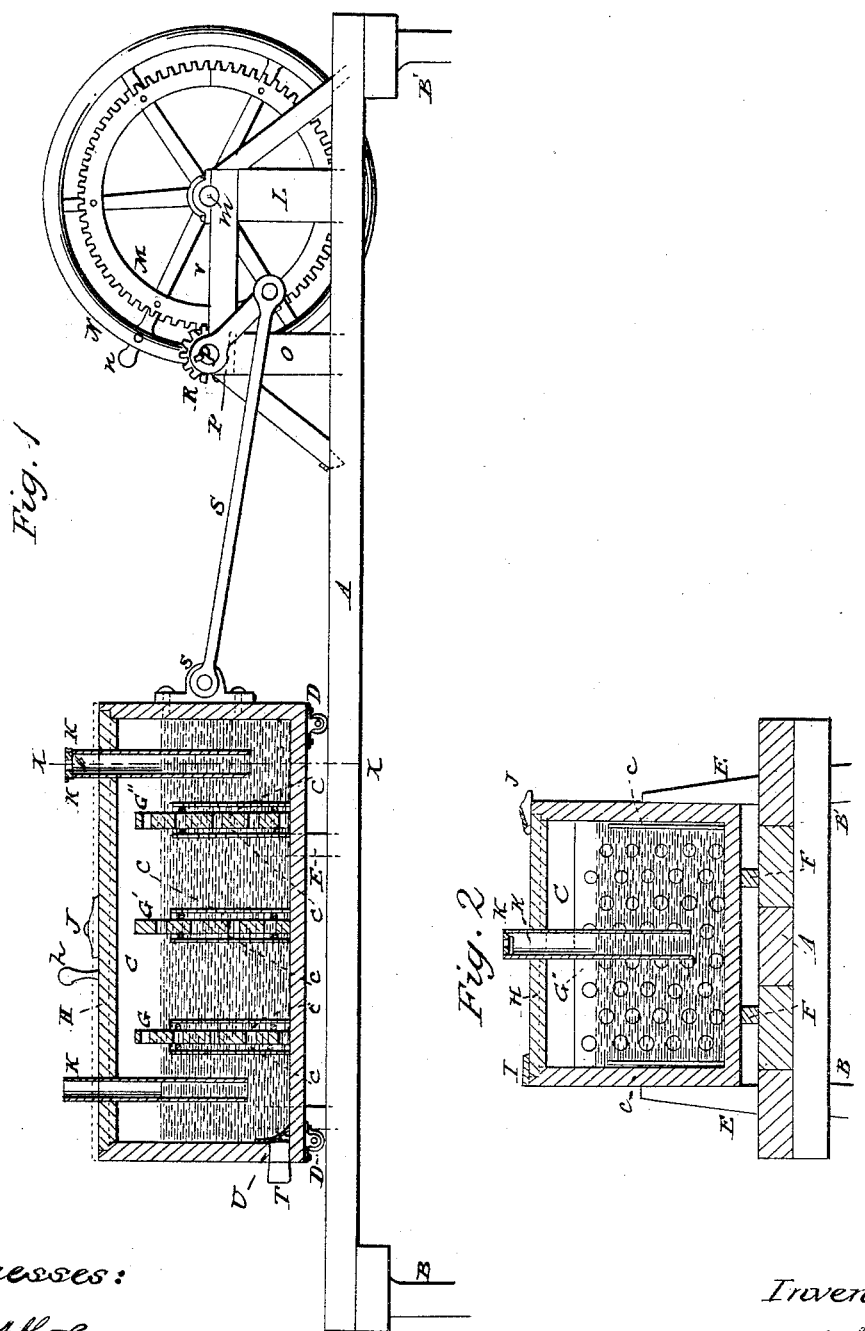

United States Patent Office.

AMALTHA E. THORN, OF FLETCHER, OHIO.

Letters Patent No. 63,580, dated April 2, 1867.

---

IMPROVEMENT IN CHURNS.

---

*The Schedule referred to in these Letters Patent and making part of the same.*

---

TO WHOM IT MAY CONCERN:

Be it known that I, AMALTHA E. THORN, of Fletcher, Miami county, Ohio, have invented certain new and useful "Improvement in Churns;" and I do hereby declare the following to be a full, clear, and exact description thereof, reference being had to the accompanying drawings, making a part of this specification.

My invention relates to that class of churns in which butter is produced by the motion of the barrel or chamber containing the cream, and my improvement consists, in the first part, in an arrangement of mechanical devices whereby said churn-barrel is operated; whilst the second part of my improvement relates to a method of producing a more thorough agitation of the cream in the barrel or chamber, and also for introducing air into the body of the cream. In the accompanying drawings—

Figure 1 is a longitudinal section of a churn embodying my improvements; and

Figure 2 represents a transverse section of the same taken at the line $x\,x$.

A represents the bed-plate which supports the churn, and its operating mechanism; and said bed-plate may be elevated a suitable distance above the floor by means of the legs B B'. The churn-barrel or chamber consists of a rectangular vessel, C, mounted on rollers D D', which run upon the upper face of the bed-plate A; and the churn-barrel is confined to a rectilinear path on said bed-plate by means of the guide-pins E E; but if preferred, the rollers D D' may be omitted, and the churn-barrel may slide on railways F F', (see fig. 2.) The churn-barrel is provided with a series of removable and perforated vertical partitions, G G' G'', which are placed in a position at right angles to the motion of the cream, in order that they may oppose the cream as much as is necessary to give it the required agitation. The partitions G are secured between the vertical cleats $c\,c$, which are attached to the sides of the churn-barrel, and the partitions can be readily withdrawn from said cleats for the purpose of cleaning, &c. The lid H enters rebates in the sides of the churn-barrel, and it is held securely in position by the longitudinal baton I, and button J, and the lid is provided with a handle, $h$. K K' are tubes which pass through the lid H, and the upper end of one or both of these tubes is furnished with a downwardly-opening valve, $k$, for the purpose of admitting air into the cream. The churn-barrel is operated by the following devices: Rising vertically from the bed-plate A is a standard, L, which affords journal-bearings for the driving-shaft $m$, to which is secured a spur-wheel, M, and a fly-wheel, N, the latter being provided with a handle, $n$, by which the driving-shaft is rotated. A similar standard, O, has journalled in it a shaft, $p$, whose inner end is provided with a crank, P, whilst its outer end has secured to it a pinion, R, which gears with the spur-wheel M. S is a pitman or connecting-rod, one end of which is secured to the churn-barrel at $s$, whilst its other end is attached to the propelling crank P, and it will be perceived that the rotation of said crank imparts a reciprocating rectilinear motion to the churn-barrel. T is a plug inserted in one end of the churn-barrel, and which, being removed, permits the buttermilk to escape. A strainer, U, over the plug orifice, prevents the escape of butter when the plug is withdrawn.

The operation of my improved churn is as follows: The cream is poured into the churn-barrel C, until it rises some distance above the lower ends of the tubes K K', or about three-fourths the entire depth of the vessel; and the attendant then proceeds to operate the churn by turning the fly-wheel N with the handle $n$, and, as the spur-wheel M has a simultaneous movement with the fly-wheel, it produces a rapid rotary movement of the pinion R, shaft $p$, and crank P. The rotation of the crank P imparts a correspondingly rapidly reciprocating motion to the churn-barrel C, and the contact of the cream with the sides and the ends of said vessel, and also with the perforated partitions G, causes such a thorough and complete agitation of the cream, that a superior quality of butter is produced in a few minutes, and with the least amount of manual exertion. The flow of the cream from one end of the churn-barrel to the other, induces a current of air to pass down the tube K; and as the valve $k$ prevents it returning up the same tube, the air is forced through the entire body of cream, thereby assisting in increasing the agitation, and it finally escapes through the other tube K'. A cheaper but inferior modification of my device can be constructed by attaching the handle $n$ to the shaft P, thus dispensing with the driving-shaft $m$, spur-wheel M, and pinion R.

I claim herein as new, and of my invention—

1. The churn-barrel or chamber C, provided with the vertical perforated partitions G, in combination with the bed-plate A, guide-pins E E', pitman S, crank P, shaft $p$, and propelling handle $n$, or their mechanical equivalents, all arranged and operating substantially as herein described, and for the purpose specified.

2. The air-valve or valves $k$, in the tubes K K', or one of them, in the described combination with the elements of the preceding clause.

In testimony of which invention I hereunto set my hand.

AMALTHA E. THORN.

Witnesses:
GEO. H. KNIGHT,
M. B. MILLER.